United States Patent [19] [11] 4,223,324

Yamamori et al. [45] Sep. 16, 1980

[54] LIQUID EJECTION SYSTEM WITH AIR HUMIDIFYING MEANS OPERATIVE DURING STANDBY PERIODS

[75] Inventors: Kiyoshi Yamamori; Akira Mizoguchi, both of Kawasaki, Japan

[73] Assignee: Matsushita Electric Industrial Co., Ltd., Osaka, Japan

[21] Appl. No.: 20,977

[22] Filed: Mar. 16, 1979

[30] Foreign Application Priority Data

Mar. 17, 1978 [JP] Japan ................................ 53-31394

[51] Int. Cl.[2] ........................................ G01D 15/18

[52] U.S. Cl. ........................................ 346/140 R

[58] Field of Search .......................... 346/75, 140 PD

[56] References Cited

U.S. PATENT DOCUMENTS

| | | | |
|---|---|---|---|
| 4,097,872 | 6/1978 | Giordano et al. | 346/75 |
| 4,106,032 | 8/1978 | Miura et al. | 346/140 PD |
| 4,146,900 | 3/1979 | Arnold | 346/75 |

*Primary Examiner*—George H. Miller, Jr.

*Attorney, Agent, or Firm*—Lowe, King, Price & Becker

[57] ABSTRACT

A liquid ejection system comprises a writing head having a liquid chamber for containing liquid therein, a liquid discharge channel, an electromechanical transducer for generating pressure rises in the liquid in the liquid chamber for discharging the liquid through the liquid discharge channel, an air chamber having an air discharge channel coaxially aligned with the liquid discharge channel for discharging dry air from the air chamber along the passage of the ejected liquid. A humidifier, which is operative during the standby mode of the system, is provided to humidify the air supplied to the air chamber. A closing member is mounted with respect to the writing head and operative to close its air discharge channel during the standby mode to direct the humidified air through the exit side of the liquid discharge channel to maintain the liquidity of the liquid in the liquid discharge channel during the standby period and open the air discharge channel during the operational period to allow ejection of dry air simultaneously with liquid to a writing surface.

6 Claims, 4 Drawing Figures

LIQUID EJECTION SYSTEM WITH AIR HUMIDIFYING MEANS OPERATIVE DURING STANDBY PERIODS

BACKGROUND OF THE INVENTION

The present invention relates to apparatus for applying fluid droplets to a writing surface, and more particularly to such a system which prevents the liquid in the discharge channel from becoming dry during standby periods to eliminate the problem of clogging of the discharge channel.

The liquid applying head comprises a liquid chamber for containing liquid therein, a liquid discharge channel and an electromechanical transducer for generating pressure rises in the liquid chamber to expel the liquid through the discharge channel into the atmosphere onto a writing surface which is a sheet of paper rolled on a rotating drum. Since the ink liquid in the forward end of the discharge channel is always exposed to the air, it tends to lose its liquidity with time and retard the ejection of liquid to the writing surface.

U.S. Pat. No. 4,106,032 discloses a liquid applying apparatus in which a stream of moisture laden air is simultaneously ejected along the passage of the discharged liquid through an air nozzle coaxially disposed with the liquid nozzle to accelerate the liquid to the writing surface and to maintain the liquidity of the ink at the exit end of the discharge channel at all times. However, this prior art apparatus has disadvantages in that (1) the moistened air stream tends to blur the image produced on recording paper, (2) because of the moisture the recording paper tends to attach to the rotating drum, making it difficult to remove the paper therefrom, and (3) since the humidified air is supplied only when the apparatus is operating, the liquid in the ejection nozzle tends to dry during the time when the apparatus is in standby mode.

SUMMARY OF THE INVENTION

Accordingly, an object of the present invention is to provide a liquid ejection system which maintains the liquidity of the liquid in the discharge channel during the time when the system is not in operation while allowing pressurized dry air to be ejected in such manner that the surface tension of the liquid in the discharge channel is lowered to facilitate ejection thereof when the system is in operation.

The system of the invention comprises a writing head having a liquid chamber supplied liquid, a liquid discharge channel through which the liquid is discharged from the liquid chamber, an air discharge channel through which dry air is ejected simultaneously with the liquid to a writing surface. A humidifier is provided which is operative when the writing head is in a standby position to humidify the air. A closing member is mounted with respect to the air discharge channel to close it when the writing head is in the standby position to direct the humidified air through the exit side of the liquid discharge channel to an air outlet channel.

Because of the closure of the air discharge channel, the humidifier is allowed to operate at intervals during the standby period, thereby minimizing the amount of power to operate the humidifier as well as the amount of water to impart humidity to the dry air. Preferably, the system is provided with a heating arrangement for heating the humidified air to prevent it from condensing in the air passage leading from the humidifier to the writing head when ambient temperature is low.

BRIEF DESCRIPTION OF THE DRAWINGS

The invention will be further described by way of example with reference to the accompanying drawings, in which.

DETAILED DESCRIPTION

Figure 1:
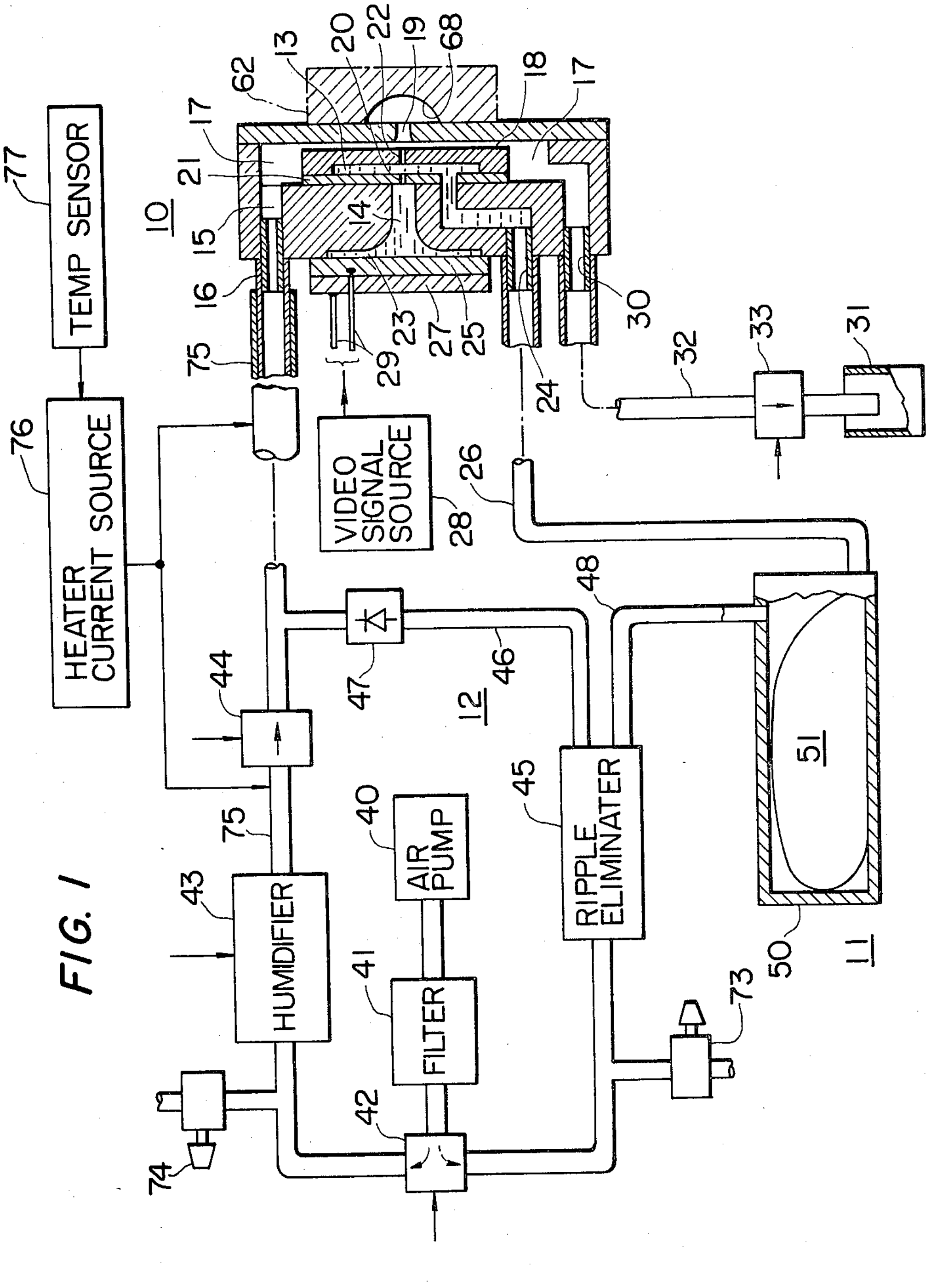
FIG. 1 is an illustration of an embodiment of the invention.

Referring to FIG. 1 apparatus of the present invention is shown and comprises generally an ink applying unit or head 10, a liquid supply source 11 and an air supply source generally designated by numeral 12. The liquid applying unit 10 comprises an outer liquid chamber portion 13, an inner liquid chamber portion 14 and a pneumatic chamber portion comprised by an air intake channel 15 connected to the air supply source 12 via a conduit 16, an annular chamber portion 17 and a disc-like chamber portion 18 which is in communication with the atmosphere via a discharge channel 19. The thickness of the disc-like chamber portion 18 is substantially smaller than the depth, or axial dimension of the annular chamber portion 17. The outer and inner liquid chambers 13 and 14 are in communication through a connecting channel 20 which is provided in a dividing plate 21 so that it is directly opposite to and axially aligned with a discharge channel 22 which is provided at the outer end of the outer chamber 13 and opens to the atmosphere from the outer chamber portion 13 through the discharge channel 19. The inner liquid chamber 14 has at its one end opposite to the outer chamber 13 a larger diameter portion 23 which is in contact with a metal plate 25. The liquid applying unit has a liquid intake channel 24 which opens into the outer liquid chamber 13 and is in communication with the liquid supply source 11 via a conduit 26. A piezoelectric member 27 is secured to the plate 25 in any conventional manner and provided with a video signal from a source 28 through a pair of conductors 29, one being connected to the plate 25 and the other being connected to the piezoelectric member 27. The cross-sectional area of the discharge channel 22 is substantially smaller than the cross-sectional area of the larger diameter portion 23 and slightly smaller than the cross-sectional area of the outer discharge channel 19.

The liquid applying unit 10 further includes an air outlet channel 30 which is in communication with the annular air chamber 17 to serve as a vent passage for moisture laden air to a receptacle 31 through a conduit 32 including a normally open electromagnetic control valve 33.

The air supply source 12 comprises an air supply pump 40, an air filter 41 for filtering the compressed air from the pump 40 and supplies the filtered air through a normally open passage of a three-way electromagnetic valve 42 to a humidifier 43. This humidifier may be any one of the conventional designs. Moisture laden air is fed through a normally open electromagnetic valve 44 and through conduit 16 to the air intake channel 15 of the ink applying unit 10. When the valve 42 is in the operative position, the filtered air is passed to a ripple eliminator 45 which may be of an air chamber of a substantial dimensions to eliminate small pressure variations of the air generated by the pump 40. The static pressurized air is supplied on the one hand through a conduit 46 and a one-way valve 47 to the air intake channel 15, and on the other hand through a conduit 48 to the liquid supply source 11. The liquid supply source 11 includes a housing 50 and a flexible liquid container 51 disposed in the housing 50. The container 51 holds ink therein to supply it through conduit 26 to the liquid chambers 13 and 14 of the unit 10 and is constantly under pressure by the air supplied to the housing 50 from the air supply source 12 through conduit 48. Because of its flexibility, the container 51 tends to deform in response to slight variations of pressure and transmits them to the liquid therein. The container 51 may be comprised of a thin film of a copolymer of vinyl chloride and vinylidene chloride.

Figure 2:
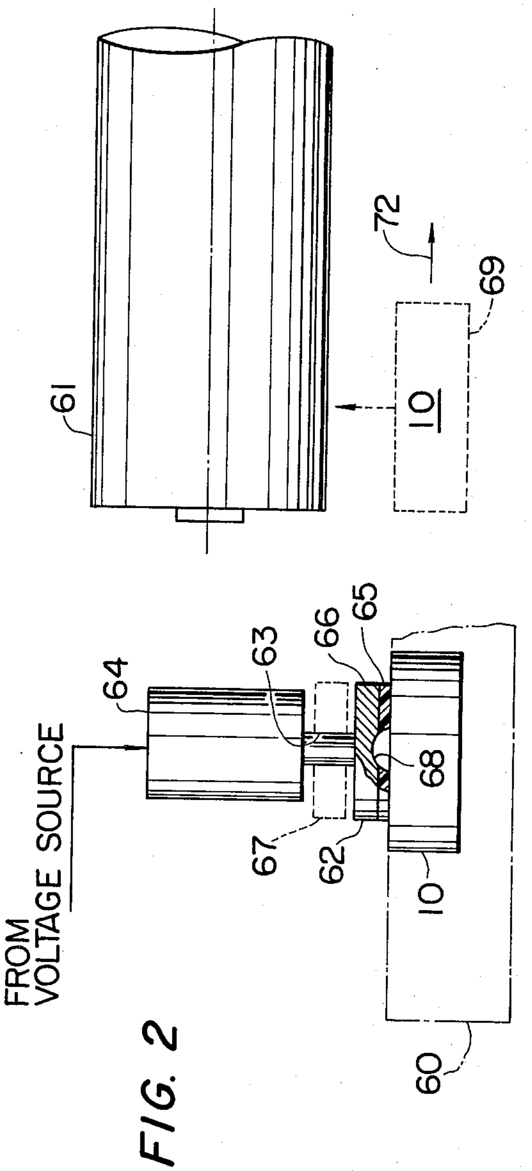
FIG. 2 is an illustration of the writing head with respect to a closing member and a rotating drum when the former is in a standby position.

All the components shown in FIG. 1 are mounted on a carrier which is schematically indicated by a chain-dot line 60 in FIG. 2 and moves from standby position to operative positions in which it is stopped to the right in synchronism with the rotation of a drum 61 on which a sheet of image recording paper is rolled. When the liquid applying unit 10 is in its standby position, the front surface of the unit 10 is in abutment with a cover member 62 mounted on one end of a plunger 63 of a cover actuator or solenoid 64 when the latter is not energized. The cover member 62 includes an elastic pad 65 secured to a pad support 66 connected to the plunger 63 and is normally in an extended position in which the pad 65 air-tightly covers the discharge channel 19 of the unit 10 when the solenoid 64 is not energized and moves to a retracted position as indicated by broken lines 67 when the solenoid is energized. The cover member 62 includes a semi-spherical recess 68 which is positioned to cover the discharge channel 19 to fill it with the moistened air during the time when the system is not in operation.

Figure 3:
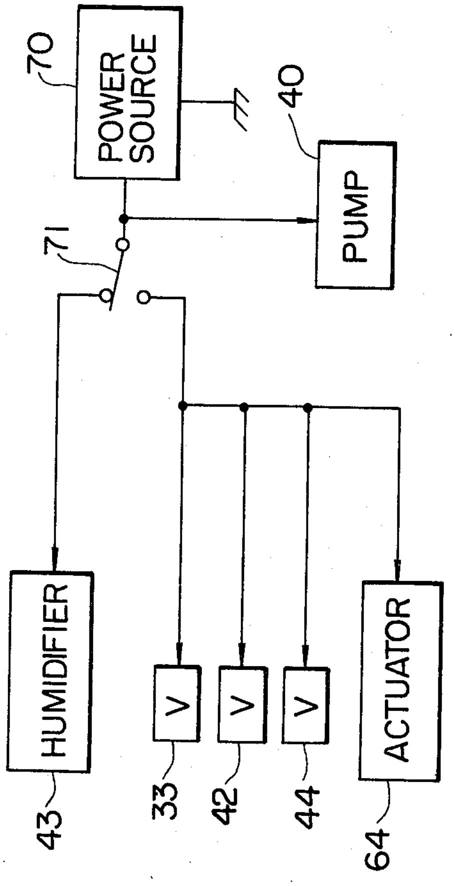
FIG. 3 is a schematic illustration of the circuits of the various parts of the embodiment of FIG. 1.

FIG. 3 illustrates an electrical connection of the system. As shown the electromagnetic valves 33, 42 and 44 and solenoid 64 are connected together to a power source 70 through normally open contacts of a switch 71 and the humidifier 43 is connected to the power source 70 through normally closed contacts of the switch 71.

When the writing head 10 is in operational mode, the switch 71 is operated to disconnect power from the humidifier 43 and connect power to the valves 33, 42, 44 and actuator 64, so that the valves 33 and 44 are closed and valve 42 is switched to open its normally closed passage and the cover member 62 is moved to the retracted position. The writing head 10 moves to a position indicated by broken lines 69. The video signal source 28 supplies driving pulses to the piezoelectric member 27 and plate 25 to produce rapid pressure rises in the liquid in the inner chamber portion 23. Fluid is discharged from the inner chamber portion 14 through the connecting channel 20, through the fluid layer in the outer chamber portion 13 and further through the discharge channels 22 and 19 whereupon it is applied to a writing surface. When the voltage pulse drops to zero the direction of the fluid stream in the connecting channel 20 is reversed and fluid is now sucked in through the outer chamber portion 13 from the ink supply container 51 via the intake channel 24.

On the other hand, a stream of dry air is supplied under constant pressure from air pump 40 through filter 41, valve 42, ripple eliminator 45 and check valve 47 to the annular chamber portion 17 of the writing head 10 through its intake channel 15. The air stream diverges as it flows through the annular path of the chamber portion 17 and then converges spirally toward the center of the disc-like chamber portion 18 and then escapes through the discharge channel 19 at a high speed. A pressure regulator 73 is provided to adjust the velocity of the air at the exit of the discharge channel 19 so that it is greater than the speed at which the liquid is discharged. The air so discharged assists in accelerating the discharged liquid. Since the liquid breaks up into a series of droplets of decreasing size in the direction toward the atmosphere upon discharge, the droplets of smaller size are accelerated at a higher speed than the droplets of larger size so that they tend to coalesce and land on the same locality on the writing surface as a single droplet corresponding to an excitation pulse.

The axial direction of the intake channel 15 may preferably be tangential to the periphery of the annular chamber 17 to allow a circular flow of air to pass through the annular chamber 17, so that the air flows into the disc-like chamber portion 18 in a spiral from radially inwardly toward the discharge channel 19. Actual dimensions of the writing head 10 is fully described in the aforesaid United States Patent.

The static pressure in the liquid in the container 51 is so maintained that the static pressure in the liquid in the discharge channel 22 is balanced against the air pressure at the exit of the discharge channel 22. This contributes to the lowering of surface tension on the boundary surface or layer of the liquid in the liquid discharge channel 22 and facilitates the ejection of liquid to the atmosphere through the outer discharge channel 19. Because of the lowering of surface tension, the minimum excitation voltage applied to the piezoelectric device 27 is lowered, and every shading nuance of the original picture can be reproduced. As mentioned above, the air stream is ejected with the discharge liquid, the ejected liquid droplets coalesce prior to reaching the writing surface, so that the edges of the reproduced image can be sharply defined.

When the writing head 10 is in standby mode, the switch 71 is released to disconnect power from the valves 33, 42, 44 and the actuator 64 and energize the humidifier 43. The writing head 10 is returned to the standby position and the cover member 62 is moved to the extended position to come into engagement with the front face of the writing head. The valves 33 and 44 open their passages and valve 42 is switched to the normally open side to direct the air from filter 41 to the humidifier 43. The moisture laden, pressurized air from the humidifier 43 is directed through valve 44 to the writing unit 10 to fill the air chambers 17 and 18 with water vapor as well as the semi-spherical recess 68 and discharged through the outlet channel 30 through valve 33 into the receptacle 31 where it condenses to water. A pressure regulating valve 74 is provided to adjust the static pressure in the chamber 18 lower than the static pressure created therein during the system operation since in the inoperative condition the liquid is not under pressure. The discharge end of the liquid in the discharge channel 22 is exposed to the moistened air passing through the air chamber 18 and thus kept under wet condition by the vapor. It is to be noted that the humidifier 43 may not necessarily be energized at all times, it being operated at intervals. In the latter case, the closing member 62 serves to hold water vapor in the air chamber to keep the surface of the liquid in the discharge channel 22 under the wet condition during the time when the operation of the humidifier 43 is interrupted. With the cover plate 62 being in the closed position with respect to the writing head 10, it is found sufficient to operate the humidifier 43 for a period of 5 to 30 minutes per day to prevent the ink from being dried up.

It is preferable that the water used in the humidification be of ion-exchanged water and an alarm device be provided to detect when the water contained in the humidifier 43 has almost been exhausted.

To prevent condensation of vapor in the conduit leading from the humidifier 43 to the air intake channel 15 when temperature is below 15° C., a layer of electrical heating arrangement such as coils or fibrous heater 75 is wrapped around the conduit 16 as well as the conduit between the humidifier 43 and valve 44 and supplied with a current from a current source 76 which is triggered in response to a signal provided from a temperature sensor 77 when ambient temperature falls below 15° C. A heating arrangement is preferably included in the humidifier 43 and ink container 51 to prevent fluids from becoming frozen if the environment so warrants.

Figure 4:
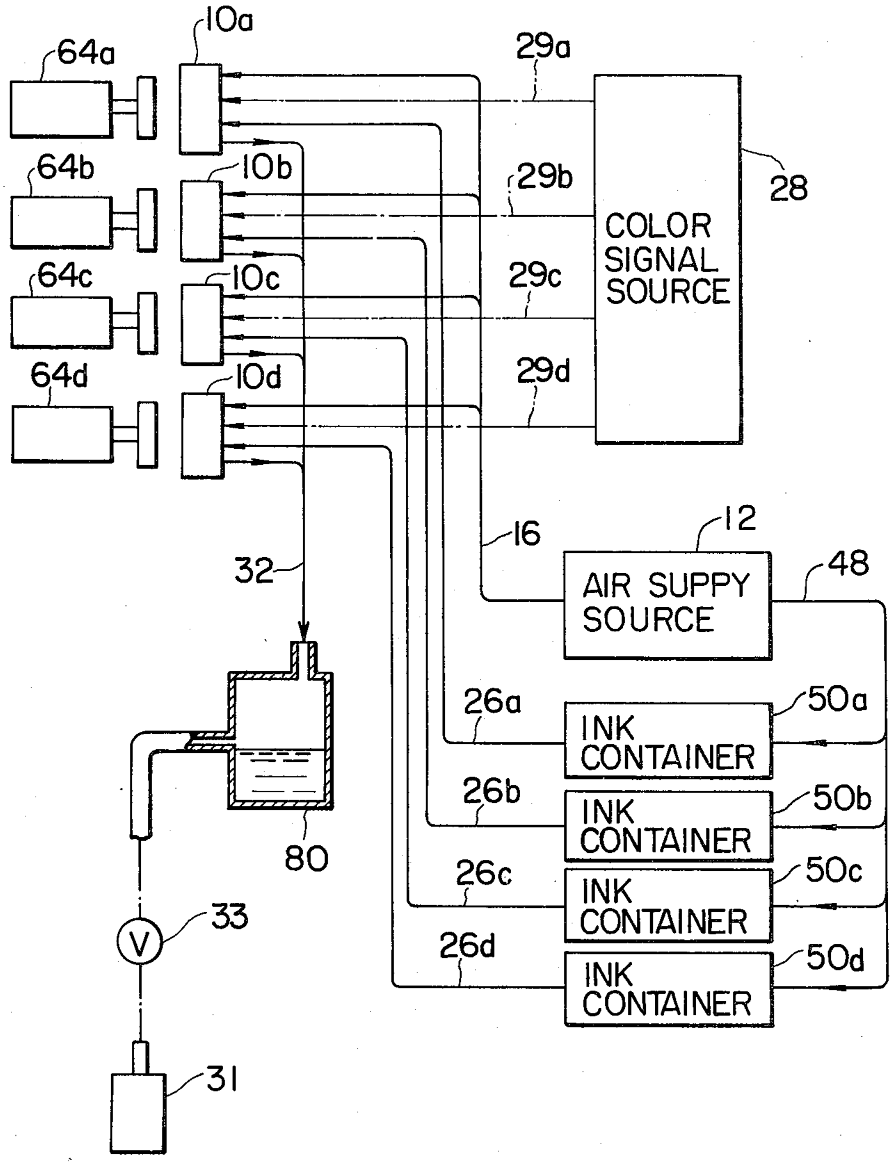
FIG. 4 is an illustration of another embodiment of the invention in which a plurality of writing heads is employed to produce a color image.

FIG. 4 is an illustration of a color ink ejection system in which a plurality of writing heads **10*a*, 10*b*, 10*c* and 10*d* are mounted on a common carrier (not shown) and disposed in abutment relation with respective cover members of actuators 64*a* to 64*d* when the heads are in their inoperative position. A color signal source 28 provides heads 10*a* to 10*d* with respective color video signals over respective lines 29*a* to 29*d*. The air supply source 12 provides pressurized dry or humidified air stream through conduit 16 in a manner as described above, the conduit 16 being branched out into respective air intake conduits for the heads 10*a* to 10*d*. A plurality of ink containers 50*a* to 50*d* is provided which are supplied with pressurized air through common conduit 48 to feed pressurized ink of different colors through respective conduits 26*a* to 26*d* to the writing heads 10*a* to 10*d*. The liquid outlet channels 30 of the heads 10 are connected together to conduit 32 which leads into a condenser 80 where the vapor condenses to water and thence to the receptacle 31 via the valve 33. The condenser 80 serves as a reservoir for the discharged vapor to maintain the vapor pressure in the heads 10*a* to 10*d* at a relatively high constant value when the humidifier 43** is suspended.

The humidifier 43 is preferably provided with a water level meter to detect when the water contained therein has exhausted to a preset level to alert the operator to refill the humidifier water.

What is claimed is:

1. A liquid ejection system comprising:

a liquid supply source;

a source of pressurized dry air;

a writing head comprising a liquid chamber connected to said liquid supply source for holding liquid therein, a liquid discharge channel, an electromechanical transducer responsive to electrical signals applied thereto for generating rapid pressure rises in the liquid in said liquid chamber for ejecting liquid through said liquid discharge channel, an air chamber connected to said source of pressurized dry air, an air discharge channel coaxially aligned with said liquid discharge channel for discharging air and liquid into the atmosphere, and an air outlet channel, said writing head being movable from a standby position in the absence of said electrical signals to operative positions in the presence of said electrical signals;

means for closing said air discharge channel of said writing head when the same is in said standby position; and means for humidifying air supplied from said air supply source when said writing head is in said standby position to allow moisture laden air to pass through a space between said aligned discharge channels to keep the liquid in said liquid discharge channel under wet condition.

2. A liquid ejection system as claimed in claim 1, wherein said liquid supply source comprises a rigid housing having its interior communicated to said source of pressurized dry air, and a flexible liquid container communicated to said liquid chamber of said writing head and air-tightly disposed in the interior of said rigid housing.

3. A liquid ejection system as claimed in claim 1, further comprising means for heating the humidified air.

4. A liquid ejection system as claimed in claim 3, wherein said heating means includes means for sensing when ambient temperature falls below a predetermined level, a heating element disposed between said writing head and said humidifying means and a source of current responsive to said temperature sensing means for passing a current into said heating element.

5. A liquid ejection system as claimed in claim 1, wherein said means for closing said air discharge channel comprises a closing member movable between an open position in which said air discharge channel is opened to the atmosphere and a closed position in which said closing member closes said air discharge channel, and an actuator for moving said closing member to said closed position when said writing head is in said standby position.

6. Apparatus for applying liquid droplets to a surface comprising:

a writing head including a liquid chamber for containing a liquid to be applied to said surface, an electromechanical transducer for generating pressure rises in the liquid in said chamber, a liquid dicharge channel for droplets of said liquid to leave the writing head, said liquid chamber having a liquid intake channel connected to a liquid supply source, an air chamber substantially divided into an inner disc-like portion formed with an air discharge channel and an outer annular portion formed with an air inlet channel connected to a source of pressurized air and an air outlet channel opposite to said air inlet channel, said air discharge channel being in alignment with said liquid discharge channel and in close proximity thereto, said writing head being movable from a standby position to an operative position;

means for providing communication for the liquid supply source with the air supply source to balance the static pressure in the liquid in said liquid discharge channel against the static pressure of air at the exit side of said liquid discharge channel;

means for closing said air outlet channel when said writing head is in said operative position to thereby permit air and liquid to be expelled simultaneously through said aligned discharge channels into the atmosphere;

means for humidifying the air supplied to said air chamber when said writing head is in said standby position; and means for closing said air discharge channel when said writing head is in said standby position to permit the humidified air to pass through said exit side said liquid discharge channel into said air outlet channel to thereby maintain the liquidity of the liquid in said liquid discharge channel.

* * * * *